Jan. 11, 1938.   O. N. WISWELL   2,104,843
DISPENSER
Filed July 31, 1935   2 Sheets-Sheet 1
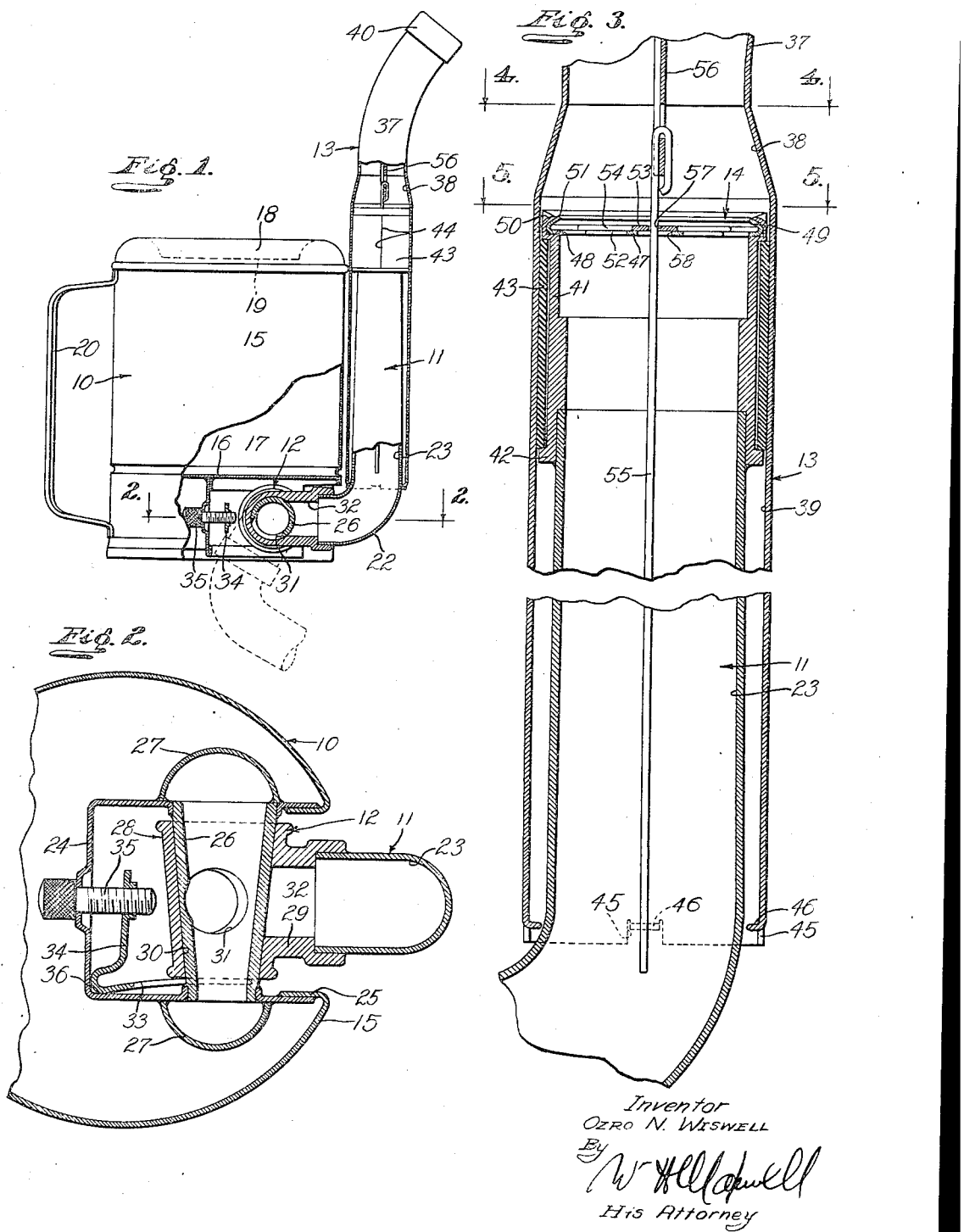
Inventor
Ozro N. Wiswell
By W H Caldwell
His Attorney Jan. 11, 1938. O. N. WISWELL 2,104,843
DISPENSER
Filed July 31, 1935 2 Sheets-Sheet 2
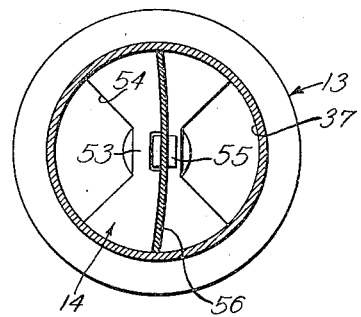
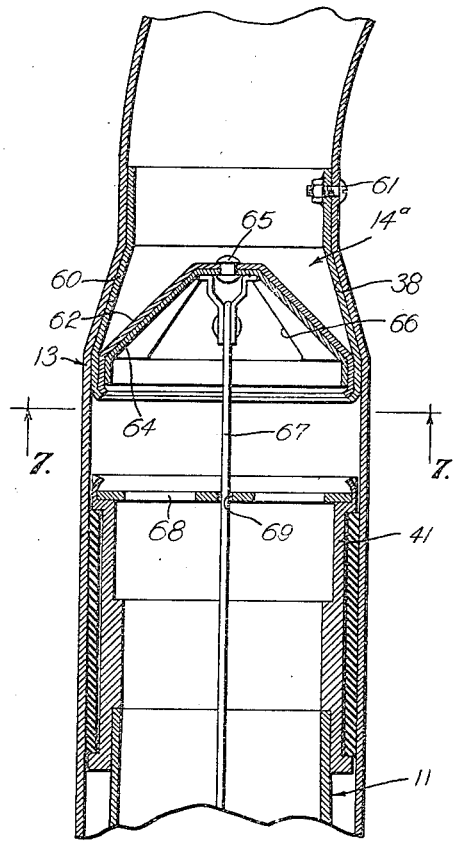
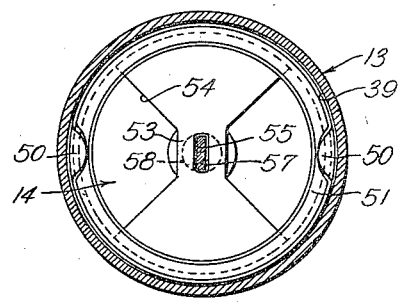
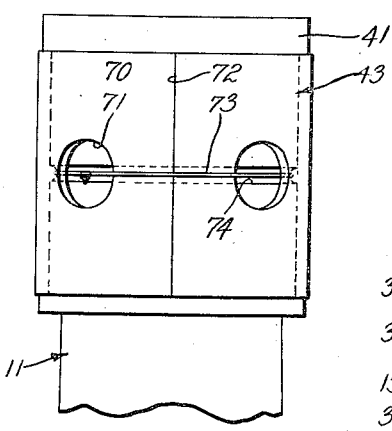
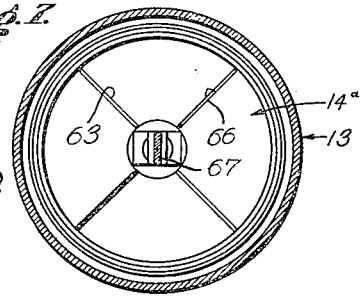
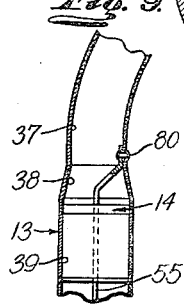
Inventor
Ozro N. Wiswell
By
His Attorney Patented Jan. 11, 1938

2,104,843

UNITED STATES PATENT OFFICE 2,104,843

DISPENSER

Ozro N. Wiswell, Los Angeles, Calif., assignor to Swingspout Measure Company, Los Angeles, Calif., a corporation of California Application July 31, 1935, Serial No. 33,988

11 Claims. (Cl. 221—26)

This invention relates to a fluid handling device and relates more particularly to a vessel or dispenser for dispensing lubricating oil, etc. A general object of this invention is to provide a practical, effective measure or dispenser for dispensing lubricants, etc., embodying means for facilitating the discharge or dispensing of the liquid into remote and inaccessible places such as the oil receiving pipes of certain types of automotive engines.

The lubricating oil employed in the crank cases of the engines of automotive vehicles is usually supplied to or poured into the oil receiving pipe of the crank cases from dispensing vessels which are also liquid measuring receptacles. One class of liquid measuring and dispensing vessels that is in general use has a swingable spout adapted to be swung to a position to discharge the oil into the oil receiving pipe of a vehicle engine and a valve at the swingable connection between the vessel and spout that automatically opens when the spout is swung to the down or discharging position. The oil receiving pipes of certain makes of automobiles and trucks are so remote and inaccessible that the operator or service station attendant is obliged to swing the spout of the dispensing receptacle to the down position where the valve is open before he can bring the spout to a position to discharge into the receiving pipe. When this occurs the attendant must close the end of the spout with his thumb as the spout is brought to its discharging position to prevent the premature discharge and loss of the oil from the spout. Where the oil receiving pipe of an engine is inaccessible because of its location or because of the presence of adjacent parts of the engine, considerable oil is often lost from the mouth of the dispensing vessel and from the spout, or both, before the spout can be properly positioned to discharge into the receiving pipe.

Another object of this invention is to provide a receptacle or vessel for dispensing lubricants such as lubricating oil that embodies an improved discharge spout having an extensible part or extension adapted to be projected as found necessary to facilitate the easy convenient discharge or delivery of the contents of the vessel into remote and inaccessible receivers or pipes.

Another object of this invention is to provide a liquid dispensing receptacle or vessel embodying a swingable discharge spout having a shiftable and projectable extension that may be easily shifted or manipulated to a desired or selected position and that will remain in the set or selected position until deliberately moved or shifted.

Another object of this invention is to provide a liquid dispensing vessel or dispenser embodying a shiftable discharge spout having an extension that is adapted to be turned as well as shifted longitudinally to bring its liquid discharging end to a position to deliver the contents of the vessel into a remote and inaccessible oil receiving pipe or the like without loss or leakage of the liquid.

Another object of this invention is to provide a liquid dispensing vessel or dispenser embodying a shiftable and longitudinally extensible discharge spout and a novel and particularly effective valve means for fully controlling the discharge of the liquid from the spout.

Another object of this invention is to provide a liquid dispensing vessel or dispenser embodying a swingable spout having a projectable or extensible extension, valve means controlled by movement or swinging of the spout for governing the passage of liquid from the vessel to the spout and an outer valve for governing the discharge of the liquid from the spout controlled by movement of the spout extension whereby the spout may be swung down to its discharging position with the outer valve closed to facilitate the proper locating of the end of the spout and the extension may then be turned or moved to open the outer valve to permit the desired discharge of liquid into the receiver.

Another object of this invention is to provide a liquid dispensing vessel of the character mentioned in which the outer valve controlled by manipulation of the spout extension may be readily adjusted or regulated to govern the rate of discharge from the spout so that the oil or liquid does not overflow or spill over from a receiving pipe having a limited liquid conducting capacity.

Another object of this invention is to provide a dispenser of the character mentioned embodying a simple and particularly effective means for sealing between the spout and the spout extension, said sealing means operating to yieldingly hold the extension in any selected or desired rotative and longitudinal position until it is again deliberately shifted.

Another object of this invention is to provide a dispenser of the character mentioned in which the spout extension and the valve associated with and controlled by the spout extension are simple and inexpensive of manufacture.

A further object of this invention is to provide a dispenser of the character mentioned that may be packed and shipped in a knocked down state with the spout extension, the packing and the outer valve loose or disassembled and that may be easily and quickly assembled for use with common available tools.

The various objects and features of my invention will be fully understood from the following detailed description of typical preferred forms and applications of the invention, throughout which description reference is made to the accompanying drawings, in which:

Fig. 1 is a side elevation of the dispenser provided by the present invention with portions broken away to illustrate the spout and valves in vertical cross section. Fig. 2 is an enlarged fragmentary transverse detailed sectional view taken as indicated by line 2—2 on Fig. 1. Fig. 3 is an enlarged fragmentary longitudinal sectional view of a portion of the spout assembly illustrating the sealing means and the valve. Fig. 4 is a transverse detailed sectional view taken as indicated by line 4—4 on Fig. 3. Fig. 5 is a transverse detailed sectional view taken as indicated by line 5—5 on Fig. 3. Fig. 6 is a fragmentary longitudinal sectional view of a portion of the spout assembly illustrating a modified or alternative form of valve. Fig. 7 is a transverse detailed sectional view taken as indicated by line 7—7 on Fig. 6. Fig. 8 is a side elevation of the outer portion of the spout illustrating an alternative form of packing means. Fig. 9 is a longitudinal fragmentary sectional view of the spout assembly illustrating an alternative manner of securing the valve rod to the spout extension.

The dispensing vessel or dispenser of the present invention includes, generally, a body 10 adapted to contain liquid, a shiftable or swingable spout 11 on the body 10, valve means 12 controlling the admission of liquid from the body 10 to the spout 11, governed by movement or swinging of the spout, a longitudinally shiftable and turnable extension 13 on the spout 11 and a valve 14 governed by rotation or turning of the extension 13 and operable to control the discharge of liquid from the spout.

The body 10 is adapted to receive and contain liquid such as lubricating oil of the class that is used in the crank cases of automotive engines. The vessel body 10 may be substantially cylindrical in its general configuration having a cylindrically curved side wall 15. The bottom or lower wall 16 of the liquid containing interior or chamber 17 of the body is spaced some distance above the lower end of the side wall 15. The upper end of the body 10 is open to receive the liquid. An inwardly projecting transversely arched lip or flange 18 is provided on the upper end of the body 10 and has an inwardly projecting substantially horizontal rim 19 on its inner edge to indicate the level to which the body chamber 17 should be filled with liquid to contain or measure a definite given quantity of liquid. A suitable handle 20 is provided on the body 10 to facilitate the manipulation of the dispenser.

The spout 11 is shiftable or swingable from a substantially vertical or upright position adjacent the side wall 15 to a downwardly and outwardly inclined position such as indicated by the broken lines in Fig. 1 where it is adapted to discharge the contents of the dispenser. The spout 11 is an elongate tubular member whose major portion is substantially straight. The spout 11 may be longitudinally tapered or of outwardly diminishing cross section as clearly illustrated in the drawings. In the preferred structure the spout 11 is located at the opposite side of the body 10 from the handle 20 and the lower portion 22 of the spout is curved inwardly at a point below the bottom wall 16. The spout 11 is shiftably or swingably connected with the body 10 by the valve means 12 as will be presently described.

The valve means 12 operates to control the passage or admission of liquid from the body chamber 17 to the spout opening 23 and swingably connects the spout 11 with the body 10 or is associated with or provided in conjunction with the means for swingably connecting the spout with the body. A substantially U-shaped vertical wall 24 is provided on the body 10 below the bottom wall 16 and its side parts extend inwardly from a gap or opening 25 in the side wall 15. The valve means 12 and the means for swingably connecting the spout 11 with the body 10 include a horizontal or transversely disposed tube 26 having its end parts connected with the side portions of the wall 24. Fluid conducting members or tube parts 27 extend downwardly from the body chamber 17 to communicate with the opposite ends of the tube 26. In accordance with the invention the tube 26 is rigid or fixed with respect to the body 10 and is longitudinally tapered.

The valve means 12 includes a T fitting or T member 28 whose lateral arm 29 is fixed to or carries the lower end of the spout 11 to communicate with the opening 23 of the spout. The longitudinal opening 30 of the T member 28 receives or passes the tube 26. The opening 30 is longitudinally tapered to conform to or effectively receive the tube 26. The T member 28 is partially rotatable on the tube 26 whereby the spout 11 may be swung between the two positions described above. It is preferred to make or provide a ground fit or engagement between the tube 26 and the wall of the opening 30. A port 31 is provided in the rear lower wall portion of the tube 26 and the opening or port 32 of the lateral arm 29 is adapted to register with the port 31 when the spout 11 approaches or reaches its discharge position. The port 31 is normally tightly closed by the wall of the T member 28 and remains closed until the spout 11 approaches its discharge position at which time the port 32 moves into communication with it.

Means is provided for maintaining the proper sealing engagement between the T member 28 and the tapered tube 26. A flexible clip has a yoked flange or arm 33 engaging the end of the T member 28 adjacent the small end of the tapered tube 26. The clip has a second arm 34 disposed at substantially right angles to the arm 33. A screw 35 extends through an opening in the wall 24 and is threaded through an opening in the arm 34. The head of the screw bears on the wall 24 so that rotation of the screw 35 moves the arm 34 inwardly or outwardly. The corner portion of the above described clip bears in a corner of the wall 24 at 36. It is believed that it will be apparent how the screw 35 may be set or adjusted to urge the T member 28 onto the tapered tube 26 with the required force to maintain a proper sealing engagement between the tube and the wall of the opening 30.

The spout extension 13 projects from the outer end of the spout 11 to form a continuation of the spout and is shiftable longitudinally on the spout to project greater or lesser distances as may be required. In accordance with the invention the spout extension 13 is telescopically related to the spout 11 for longitudinal and rotative movement with relation thereto. In the preferred form of the invention illustrated the extension 13 telescopes over the spout 11, being adapted to surround a substantial portion of the spout 11 when in the retracted position. The major inner portion of the extension 13 is cylindrical or of uniform diameter while the outer portion 37 of the extension is reduced in diameter and is curved to more readily enter oil receiving pipes and the like. A tapered part connects the reduced outer portion 37 of the extension with the body or major portion of the extension providing an internal tapered shoulder 38 on the wall of the opening 39 of the extension. A bead or ferrule 40 may be provided on the outer end of the extension 13.

The invention provides novel and particularly effective means for sealing or packing between the spout 11 and the spout extension 13. The packing means includes a collar or spool member 41 attached to or fixed on the outer end of the spout 11 to project therefrom. The spool member 41 is cylindrical or of uniform diameter and has radial or outwardly projecting annular flanges 42 at its opposite ends. A packing part 43 is provided on the spool member 41 between its flanges 42. The packing part 43 may be a simple piece or length of leather or like packing material wrapped on the member 41 between its flanges 42. The packing part 43 has sealing engagement with the interior of the extension 13 and, of course, has sealing engagement with the periphery of the spool member 41. The packing part 43 is retained in position on the spool member 41 by the extension 13 which confines it to the extent that it cannot slip over the flanges 42. In accordance with the invention the packing part 43 is proportioned so that its longitudinal edges 44 are held in engagement or abutment by the confining action of the spout extension 13. The engagement of the abutting edges 44 limits the degree of inward contraction of the packing part 43 on the spool member 11 so that the part 43 remains in tighter engagement with the interior of the extension 13 than it does with the spool member 41 and, therefore, tends to move with the extension 13 when the extension is shifted or turned relative to the spout 11. The cooperation of the edges 44 also assures the sealing or packing off against the longitudinal leakage of the fluid between them.

The packing part 43 may have slight or limited longitudinal movement on the spool member 41 and when the spout extension 13 is moved longitudinally relative to the spout 11 the packing part 43 may shift longitudinally on the spool member 41 so that one of its ends tightly bears on a flange 42 to insure a tight sealing cooperation therewith. The engagement of the packing part 43 with the spool 41 and the spout extension 13 holds the extension 13 against movement in any set or adjusted position until deliberately moved by the user. Thus the packing part 43 in addition to sealing between the spool member 41 on the outer end of the spout 11 and the extension 13 serves to hold the spout extension in any adjusted or selected position. The inward movement of the spout extension 13 on the spout 11 may be limited by the engagement of the shoulder 38 with the outer end of the spool member 41. Spaced cuts 45 may be provided in the inner end of the spout extension 13 and the tabs 46 between the cuts 45 may be bent inwardly to engage the inner end of the spool member 41 for the purpose of limiting the outward movement of the spout extension 13 on the spout 11.

The valve 14 is provided to control the flow of liquid through the spout extension 13 and the discharge of liquid from the spout extension and, in accordance with the invention the valve 14 is governed or controlled by manipulation of the extension. In the particular form of the invention being described the valve 14 includes a plate or disc 47 seated on a shoulder 48 in the outer portion of the spool member 41. The disc 47 has an upturned peripheral flange 49 whose upper edge portion 51 is turned inwardly. The disc 47 may be held against movement by crimping or bending the wall of the spool member 41 inwardly against the flange 49 as at 50. The disc 47 constitutes the relatively stationary element of the valve 14 and is provided with one or more ports 52. The ports 52 are arcuate or segmental having radial side walls and concentric inner and outer walls. One port 52 is preferably positioned to be in the lowermost part of the disc 47 when the spout 11 is in its discharge position to insure the full free drainage of liquid from the body 10 and the spout. The valve 14 includes a movable valve member 53 for cooperating with the upper or outer side of the disc 47. The valve member 53 is disc shaped and its peripheral edge portion is rotatably received by the flange 49 so that it is held against longitudinal shifting and displacement. The valve member 53 is adapted to turn or rotate relative to the stationary disc 47 and has ports 54 movable into and out of register with the ports 52. The valve member 53 is movable between a position where it closes or substantially closes the ports 52 and a position where its ports 54 fully register with the ports 52.

The valve 14 includes means for connecting the valve member 53 with the spout extension 13 to turn with the spout extension. The operative connection between the valve member 53 and the spout extension 13 includes a stem or rod 55 of rectangular cross section and a flexible plate 56 connected with the outer end of the rod. The plate 56 is substantially rectangular and is adapted to be entered or forced into the reduced portion of the opening 39 extending through the outer portion 37 of the spout extension. The flexible plate 56 is proportioned so that it is transversely bent or bowed when it is forced into the reduced portion of the opening 39. The resiliency of the plate 56 dependably sets or holds the plate in the opening of the extension 13 so that the plate moves with the extension. The rod 55 extends substantially centrally through the extension 13 and slidably passes through a polygonal or rectangular opening 57 in the valve member 53 and continues freely through a round opening 58 in the disc 47 to extend into the spool member 41. The rod 55 cooperates with the opening 57 so that the valve member 53 is turned when the rod turns. When the spout extension 13 is turned the rod 55 connected with the spout by the plate 56 likewise turns and the rod cooperating with the opening 57 causes the valve member 53 to turn. Thus the extension 13 of the spout may be partially turned to shift the valve member 53 between its open and closed positions. The parts just described are preferably related so that the valve member 53 is in its open position when the curved reduced portion 37 of the extension 13 faces forwardly and is in its closed position when the extension portion 37 faces or projects laterally.

Figs. 6 and 7 of the drawings illustrate a modified or alternative form of valve 14ᵃ for governing the discharge of liquid from the spout and the spout extension 13. The valve 14ᵃ includes a tubular and longitudinally tapered valve body 60 seating outwardly against the shoulder 38 on the interior of the spout extension 13. The valve body 60 may be secured to the extension 13 by a screw or rivet 61. A conical or frusto-conical web 62 is provided across the interior of the tubular valve body 60. Spaced arcuate or segmental ports 63 are provided in the web 62. A valve member 64 is adapted to operate on or cooperate with the inner side of the web 62. A pivot pin 65 may connect the member 64 with the web 62 for pivotal or rotative movement. Ports 66 are provided in the valve member 64 and the member 64 is movable between a position where it closes the ports 63 and a position where its ports 66 are in full register with the ports 63. A connection is provided between the spout 11 and the valve member 64 to hold the member against turning with the extension 13. A stem or rod 67 of rectangular cross section is connected with the valve member 64 and extends inwardly or longitudinally through the extension 13. The spool member 41 carries a non-rotatable perforate disc 68 having a slot or elongate opening 69 slidably passing the rod 67. The cooperation of the opening 69 with the rod 67 prevents turning of the rod 67 and the valve member 64 relative to the spout 11. Thus when the spout extension 13 is turned or partially turned the web 62 is turned relative to the valve member 64. The spout extension 13 may be turned between a position where its reduced portion 37 faces laterally to a position where its reduced portion 37 faces forwardly to move the ports 63 from positions where they are closed by the member 64 to positions where they are in communication with the ports 66 to permit the free discharge of liquid from the spout extension.

Fig. 8 of the drawings illustrates a modified form of packing for packing or sealing between the spout 11 and the spout extension 13. The form of packing means illustrated in Fig. 8 of the drawings includes a packing parts 70 of leather or the like wrapped about or arranged on the spool member 41 between its flanges 42. The packing part 70 may be similar to the packing part 43 having longitudinal edges which abut or approximately abut and having axial edges adapted to cooperate with the flanges 42. Openings 71 are provided in the packing part 70 at points spaced from the longitudinal edges 72 of the packing part. A wire 73 is trained through a circumferential groove 74 in the spool member 41 and extends through the openings 71 to pass over the portion of the packing part 70 between the openings. The ends of the wire 73 are twisted together or otherwise connected. The wire 73 holds the packing part 70 assembled on the spool member 41, thus facilitating the assembly of the spout extension 13 on the spout 11.

Fig. 9 of the drawings illustrates an alternative manner of connecting the valve stem or rod 55 with the spout extension 13. The rod 55 extends outwardly through the spout extension 13 and its outer portion is laterally or transversely curved at or adjacent the shoulder 38 to engage or contact the wall of the opening 37. A screw, rivet 80, or the like, may connect the upper or outer end of the rod 55 with the spout extension 13. The rod 55 shown in Fig. 9 of the drawings is provided for the same purpose as the rod 55 described above, and operates in the same manner.

When the receptacle or dispenser body 10 is to be filled with liquid the spout 11 is preferably brought to its upright or vertical position where the valve 12 is closed. The body 10 in being open topped is readily filled with oil or other liquid. The dispenser may be conveniently handled and carried and brought to a position where the spout 11 and spout extension 13 may be manipulated to bring the outer end of the spout extension into the oil receiving pipe of an engine. Where the oil receiving pipe of the engine is remote and inaccessible it may be desirable or necessary to shift the spout extension 13 outwardly on the spout 11 to lengthen the spout assembly so that the discharge end of the spout extension may be readily entered in the pipe. If it is necessary to swing the spout 11 or the spout assembly downwardly in order to bring the discharge end of the extension 13 into the pipe it is preferred to turn the extension 13 to a position where the valve 14 is closed. With the valve 14 in its closed position the spout assembly may be safely and conveniently manipulated or moved to bring the outer end of the extension 13 into the pipe without the danger of losing or spilling the liquid. It is believed that it will be apparent how the spout 11 and the spout extension 13 may be readily shifted and manipulated to bring the outer end of the extension to the position where it may discharge into the oil receiving pipe.

The spout 11 may be moved downwardly or the body 10 may be moved upwardly relative to the spout to bring the parts to the positions where the port 31 communicates with the port 32 to permit the flow of the liquid from the body 10 into the spout opening 23. In the event that the oil receiving pipe of the engine is small in diameter or receives the oil slowly it may be necessary to turn the spout extension 13 to a position where the ports 52 are partially covered or closed by the valve member 53. Thus the valve 14 may be employed to control the rate of discharge of the liquid from the spout extension 13. The valve 12, the spout 11, the valve 14 and the spout extension 13 are such that the oil or liquid in the receptacle is permitted to freely and entirely drain from the body chamber 17 and the spout extension. As described above, the packing part 43 cooperates with the spout extension 13 and the spool member 41 to yieldingly hold the extension 13 in position. The packing part 43 fully and dependably seals between the spout and the spout extension and forms a dependable guide for the spout extension. The provision of the two valves 12 and 14 in the dispenser provides for the full and convenient control of the spout assembly and the discharge of the liquid from the dispenser.

The improved dispenser of this invention may be packed and shipped in a knocked down state with the spout extension assembly detached or loose from the dispenser, said assembly comprising the extension 13 and the valve rod 55 with its plate 56 properly secured in the extension. With these parts disassembled the dispenser may be packed and shipped in a comparatively small carton. When shipped in this manner the spout extension 13 is shipped or delivered with the tabs 46 straight. The packing port 43 may be tied in place on the spool member 41. When the dispenser is to be assembled the inner or lower end of the extension 13 is started or telescoped over the spool member 41 to engage over the packing part 43. Before this is done the valve rod 55 is entered in the polygonal opening 57 in the valve member 53 and passed through the opening 58, the rod 55 being sufficiently long to extend beyond the lower end of the extension to be readily introduced in the openings 57 and 58. The extension 13 may be slid inwardly on the spout 11 to properly confine the packing part 43 on the spool member 41. The tabs 46 may then be bent inwardly to prevent the longitudinal displacement of the extension 43 from the spout. It is to be noted that the spout extension 13 and its associated parts may be easily and quickly assembled on the spout 11 with simple, available tools.

The valve means illustrated in Figs. 6 and 7 of the drawings operates in substantially the same manner as the valve 14. The spout extension 13 may be turned to move the web 62 between the position where the ports 63 and 66 are out of alignment and a position where the ports 63 and 66 register to permit the discharge of liquid from the spout. The packing means shown in Fig. 8 of the drawings facilitates the assembly of the spout extension 13 on the spout as it is unnecessary to position the packing member and hold it in place when the extension is being assembled on the spout.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. A spout comprising, telescopically assembled tubular members related for relative longitudinal and rotative movement, a valve within and carried by a member for controlling the flow through the spout and an operative connection between the valve and another member whereby the valve is governed by relative movement between said members.

2. A spout comprising, telescopically assembled tubular members related for relative longitudinal and rotative movement, a valve arranged across the interior of one of the members for controlling the flow through the spout, and a stem connected with another member and cooperating with the valve whereby the valve is governed by relative turning between the members.

3. A liquid dispenser including a body adapted to contain liquid, an extensible spout shiftably connected with the body comprising relatively shiftable telescopically related tubular members, a valve for controlling the admission of liquid from the body to the spout governed by shifting of the spout, and a valve for controlling the discharge from the spout governed by relative movement between the members.

4. A liquid dispenser including, a body adapted to contain liquid, an extensible spout on the body comprising telescopically related tubular members associated for relative longitudinal and rotary movement, and valve means for the spout controlled by relative rotary movement between the members including two cooperable valve parts, one valve part movable with one member and an operative connection between the other member and the other valve part.

5. In a liquid dispenser having a liquid containing body, an extensible spout for the body comprising two relatively shiftable tubular members one extending within the other, and a packing part surrounding the inner member and cooperating with the members to seal between them, the cooperation of the packing part with the outer member causing the part to move therewith.

6. In a liquid dispenser having a liquid containing body, an extensible spout for the body comprising two relatively shiftable tubular members one extending within the other, and a packing part wrapped about the inner part to seal between the members, the longitudinal edges of the part abutting to cause the part to bear outwardly against the inner member and move therewith.

7. A liquid dispenser including a body adapted to contain liquid, a discharge spout swingably connected with the body, a turnable and longitudinally shiftable extension on the spout, a valve on the spout for controlling the flow therethrough, and an operative connection between the extension and the valve whereby turning of the extension operates the valve.

8. A liquid dispensing vessel comprising a vessel body, a shiftable discharge spout on the body, a longitudinally and rotatably shiftable extension on the spout, and valve means for the spout, including a relatively stationary valve part on the spout, a rotatable valve part for cooperating with the relatively stationary valve part, and a stem connected with the extension to move therewith and associated with the rotatable valve part to cause the valve part to turn with the extension.

9. A liquid dispensing vessel comprising a vessel body, a shiftable discharge spout on the body, a longitudinally and rotatably shiftable extension for the spout, and valve means for the spout including a valve part movable with the extension, a second valve part associated with the first valve part to move longitudinally therewith and to turn relatively thereto, and a stem connected with the second valve part and held against rotation relative to the spout whereby the second valve part is held against turning during turning of the extension.

10. A liquid dispenser comprising a body for containing liquid, an extensible spout comprising an inner member and an outer member telescopically related for relative rotary and longitudinal movement, means swingably connecting the spout with the body to receive liquid from its interior, a valve controlling flow through the inner member, and an operative connection between the valve and outer member whereby turning of the outer member relative to the inner member operates the valve.

11. A liquid dispenser comprising a body for containing liquid, an extensible spout comprising an inner member and an outer member telescopically related for relative rotary movement, means connecting the inner member with the spout to receive liquid therefrom, a valve in the inner member for controlling flow from the inner member and operable by a turning force, and a stem turnable with the outer member and cooperating with the valve to transmit turning movement from the outer member to the valve to control the same.

OZRO N. WISWELL.